United States Patent
Orús Lacort et al.

(10) Patent No.: US 12,316,384 B2
(45) Date of Patent: May 27, 2025

(54) SATELLITE-BASED REMOTE QUANTUM COMPUTATION

(71) Applicants: Multiverse Computing S.L., San Sebastián (ES); Hispasat S.A., Madrid (ES)

(72) Inventors: Román Oscar Orús Lacort, San Sebastián (ES); Jesus Enrique Lizaso Olmos, Matadepera (ES); Pedro Pintó Marín, Madrid (ES); Antonio Abad Martín, Almería (ES)

(73) Assignees: MULTIVERSE COMPUTING S.L., San Sebastian (ES); HISPASAT S.A., Madrid (ES)

(*) Notice: Subject to any disclaimer, the term of this patent is extended or adjusted under 35 U.S.C. 154(b) by 240 days.

(21) Appl. No.: 18/085,224

(22) Filed: Dec. 20, 2022

(65) Prior Publication Data
US 2023/0198634 A1   Jun. 22, 2023

Related U.S. Application Data

(60) Provisional application No. 63/292,048, filed on Dec. 21, 2021.

(51) Int. Cl.
*H04B 10/70*  (2013.01)
*G06N 10/20*  (2022.01)

(52) U.S. Cl.
CPC ............ *H04B 10/70* (2013.01); *G06N 10/20* (2022.01)

(58) Field of Classification Search
CPC ................................ H04B 10/70; G06N 10/20

(Continued)

(56) References Cited

U.S. PATENT DOCUMENTS

| | | | |
|---|---|---|---|
| 11,438,076 B2 * | 9/2022 | Faraon | B82Y 20/00 |
| 11,641,242 B1 * | 5/2023 | Bhaskar | H04B 10/70 |
| | | | 398/130 |

(Continued)

FOREIGN PATENT DOCUMENTS

| | | | | |
|---|---|---|---|---|
| WO | 2018/236925 A1 | 12/2018 | | |
| WO | WO-2021090026 A1 * | 5/2021 | ........... | H04B 10/118 |
| WO | WO-2021245529 A1 * | 12/2021 | ............... | G21K 1/00 |

OTHER PUBLICATIONS

Cuomo et al; Towards a Distributed Quantum Computing Ecosystem; Mar. 2020; pp. 1-8. (Year: 2020).*

(Continued)

*Primary Examiner* — Amritbir K Sandhu
(74) *Attorney, Agent, or Firm* — 24IP Law Group USA, PLLC; Timothy R. DeWitt

(57) ABSTRACT

A distributed quantum computing system 10 and a method for implementing the distributed quantum computing system 10 is disclosed. The distributed quantum computing system 10 comprises at least two ground nodes 20a, 20b located apart at a distance. The ground nodes 20a, 20b comprise a quantum processor 30, a quantum channel unit 40a, 40b for establishing quantum channels 50 with other ones of the at least two ground nodes 20, a coupling unit 60a, 60b for transferring quantum information between the quantum processor 30 and the quantum channel unit 40. A satellite unit 110 creates entanglement between a first channel unit 40a in a first ground node 20a and a second channel unit 40b in a second ground node 20b to enable establishment of said quantum channels 50.

10 Claims, 2 Drawing Sheets

(58) Field of Classification Search
USPC .......................................................... 398/39
See application file for complete search history.

(56) References Cited

U.S. PATENT DOCUMENTS

| | | | |
|---|---|---|---|
| 2020/0050959 A1* | 2/2020 | Ashrafi ................. | G06N 3/065 |
| 2021/0176055 A1 | 6/2021 | Rahman et al. | |
| 2023/0198634 A1* | 6/2023 | Orús Lacort .......... | G06N 10/20 |
| | | | 380/256 |
| 2023/0342650 A1* | 10/2023 | Chen ...................... | H04B 10/70 |

OTHER PUBLICATIONS

Ren et al; Ground-to-satellite quantum teleportation ; Sep. 2017; Nature.com; pp. 1-13. (Year: 2017).*

Cuomo et al "Towards a distributed quantum computing ecosystem", IET Quantum Communication, DOI: 10.1049/iet-qtc.2020.0002.

Khatri et al., "Spooky action at a global distance: analysis of space-based entanglement distribution for the quantum internet" by Khatri et al., NPJ Quantum Information, vol. 4 (2021), pp. 1-15.

Amoldeep Singh et al: "Quantum Internet-Applications, Functionalities, Enabling Technologies, Challenges, and Research Directions", arxiv.org, Cornell University Library, 201 Olin Library Cornell University Ithaca, NY 14853, 2021.

Satellite-based entanglement distribution over 1200 kilometers Yin et al., Science 356, 1140-1144 (2017).

* cited by examiner

SATELLITE-BASED REMOTE QUANTUM COMPUTATION

CROSS-REFERENCE TO RELATED APPLICATIONS

This application claims the benefit of U.S. Provisional Application No. 63/292,048 filed on Dec. 21, 2021, and to European Patent Application No EP21383170 filed on Dec. 21, 2021, both of which are hereby incorporated by reference.

BACKGROUND OF THE INVENTION

Field of the Invention

The field of the invention relates to a distributed quantum computer system.

Brief Description of the Related Art

Quantum computing is a type of computation that harnesses the collective properties of quantum states, such as superposition, interference, and entanglement, to perform calculations. The devices that perform quantum computations are known as quantum computers. A variety of physical systems have been developed for quantum computing applications. Nonlimiting examples include superconducting circuits, trapped ions, spin systems and others.

While present technology allows the construction of a few-qubit quantum processors, it is a technological challenge to scale the quantum processors up to many qubits, which would provide increased computational power. One way of solving the scalability problem is by interconnecting few-qubit quantum processors via quantum channels, in such a way that interconnected quantum processors could operate coherently as a whole. Establishing such quantum channels could be done via pairs of maximally entangled particles, as done already in some quantum communication protocols using photonic technology.

A number of publications on the construction of a distributed quantum computer system are known. For example, a review article in IET Quantum Communication, by Cuomo et al "Towards a distributed quantum computing ecosystem", DOI: 10.1049/iet-qtc.2020.0002, discloses an overview of the main problems and challenges arising in the design of a distributed quantum computing network.

An international patent application No. WO 2018/236925 (Smith et al, assigned to Rigetti) teaches a method accessing distributed quantum computing resources in a distributed quantum computing system. The method comprises receiving a job request for accessing a quantum computing resource and on authentication of a user associated with the job request, by operation of one or more processors, assigning a job identifier to the job request. A particular quantum computing resource is selected for the job request and the job request is pushed onto a queue to be processed for execution by the quantum computing resource.

Space-based entanglement distribution for the quantum internet is known from the publication in NPJ Quantum Information, vol 4 (2021), pages 1-15, "Spooky action at a global distance: analysis of space-based entanglement distribution for the quantum internet" by Khatri et al.

A review article in Arxiv.org, Cornell University library, 201 OLIN Library Cornell university Ithaca, NY 14853, by SINGH et al. "Quantum Internet Applications, Functionalities, Enabling Technologies, Challenges, and Research Directions" discloses an overview of Quantum Internet functionalities, technologies, applications, and developments in the field of the Quantum Internet.

A research article by Yin et al. "Satellite-based entanglement distribution over 1200 kilometers", Science 356, 1140-1144 (2017) discloses a satellite-based distribution of entangled photon pairs to two locations separated by 1203 kilometers on Earth, through two satellite-to-ground downlinks with a summed length varying from 1600 to 2400 kilometers.

SUMMARY OF THE INVENTION

The document relates to a system and methods necessary to carry a distributed quantum computation between geographically separated locations, assisted by quantum channels set up by a satellite system. In a non-limiting implementation of the system, the satellite emits pairs of maximally entangled photons, with each photon being stored at a quantum node on earth surface. In another implementation of the system, the satellite receives pairs of photons which, after appropriate manipulation on the satellite, maximally entangle the quantum nodes on earth surface. The quantum nodes also include an individual quantum processor. When a 2-body gate is to be done between the two distant locations, the established quantum channel is used to implement the gate via local operations and quantum communication.

The distributed quantum computing system and method outlined in this document enables scalability of the quantum computers and allows the quantum computers to be connected at very large physical distances, hence allowing the possibility to interconnect many quantum processors from different labs worldwide and making the interconnected quantum processors work coherently as a whole.

The distributed quantum computing system set out in this document comprises at least two ground nodes which are located apart at a distance. The ground nodes comprise a quantum processor, a quantum channel unit for establishing quantum channels with other ones of the two ground nodes, a coupling unit for transferring quantum information between the quantum processor and the quantum channel unit. A satellite unit is used for creating entanglement between a first channel unit in a first ground node and a second channel unit in a second ground node to enable establishment of said quantum channels. The satellite unit comprises a photon source of entangled photons, the photon source is adapted to transfer a pair of entangled photons to the first ground node and the second ground node.

The distributed quantum computing system may have a gate implementer module adapted to use said quantum channels to implement a distant qubit gate between the first ground node and the second ground node.

In one aspect, the satellite unit comprises a photon source of entangled photons adapted to emit a pair of entangled photons. The first ground node has a first quantum channel unit for receiving a first photon of said pair of entangled photons and storing a quantum state of the first photon, and the second ground node has a second quantum channel unit for receiving a second proton of said pair of entangled photons and storing a quantum state of the second photon.

The first quantum channel unit and the second quantum channel unit may be at least one of a cavity QED system or an ion crystal. In one aspect, the first quantum channel unit has a first ion trap processor for emitting a first photon, and the second quantum channel unit has a second ion trap processor for emitting a second photon. The satellite unit is adapted to receive the first photon and the second photon emitted from the first ground node and the second ground node and comprises a photonic interference and measurement system for setting up a pair of entangled photons and the quantum between the first ground node and the second ground node.

The ground nodes can have a classical communications module for standard communications with other classical communications modules of other ones of the ground nodes and with a satellite communication module.

The present document further proposes a method of implementing a distributed computing system comprising at least two ground nodes which are located apart at a distance set out. The method comprises establishing at least one quantum channel between the ground nodes. This step of establishing the quantum channel comprises creating entanglement, by a satellite unit, between the first channel unit in the first ground node and the second channel unit in the second ground node.

In one aspect, a qubit gate is implemented between the ground nodes by sending, by the first ground node, a first qubit and, classical information obtained by measuring a first entangled photon and a first qubit, receiving the classical information at the second ground node, and reconstructing the first qubit in the second ground node from the received classical information and a second entangled photon.

The method can subsequently comprise sending back the first qubit to the first ground node by sending, by the second node, classical information obtained by measuring the second entangled photon and its qubit.

In a further aspect, the establishing of the at least one quantum channel between the distant ground nodes comprises emitting, by a source of entangled photons in a satellite unit, a pair of first entangled photons and second entangled photons, and receiving, by or at the first ground node, the first entangled photon and storing the quantum state of the first entangled photon, followed by receiving, by or at the second ground node, the second entangled photon and storing the quantum state of the second entangled photon, to establish the at least one quantum channel.

In one aspect, the establishing of the at least one quantum channel comprises receiving photons by emitting a first photon by the first quantum channel unit and a second photon by the second quantum channel unit. The satellite unit receives the first photon emitted from the first ground node and the second photon emitted from the second ground node and processes the first photon and the second photon with a photonic interference and measurement system to create a pair of entangled photons and a quantum channel between the first ground node and the second ground node.

The satellite unit is used for creating entanglement between channel units in at least two ground nodes and thereby enabling establishment of a quantum channel between the at least two ground nodes.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature and not as restrictive. Additional objects and advantages of the invention will be set forth in part in the description which follows and in part will be obvious from the description or may be learned by practice of the invention.

DESCRIPTION OF THE FIGURES

For a more complete understanding of the present invention and the advantages thereof, reference is now made to the following description and the accompanying drawings, in which.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

The distributed quantum computing system and method here provide a way to interconnect geographically distant few-qubit quantum processors via quantum channels that are settled using satellite-based technology. A network of satellite units in satellites (for example in a geostationary orbit) settles the necessary quantum channels so that the distant quantum processors can operate coherently as a whole, thus incrementing the overall computational power. The satellites can establish the quantum channels using different protocols, depending on the quantum processors on Earth's surface.

Figure 1:
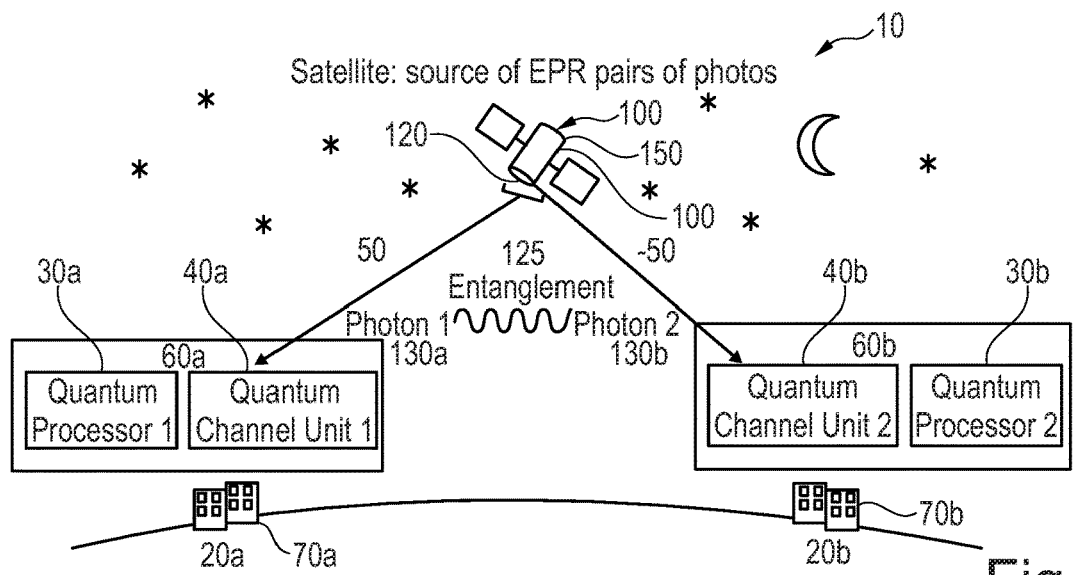
FIG. 1 shows a schematic view of a first implementation of the minimal system, with the satellite sending a pair of EPR-entangled photons to two ground units at distant locations.
Figure 2:
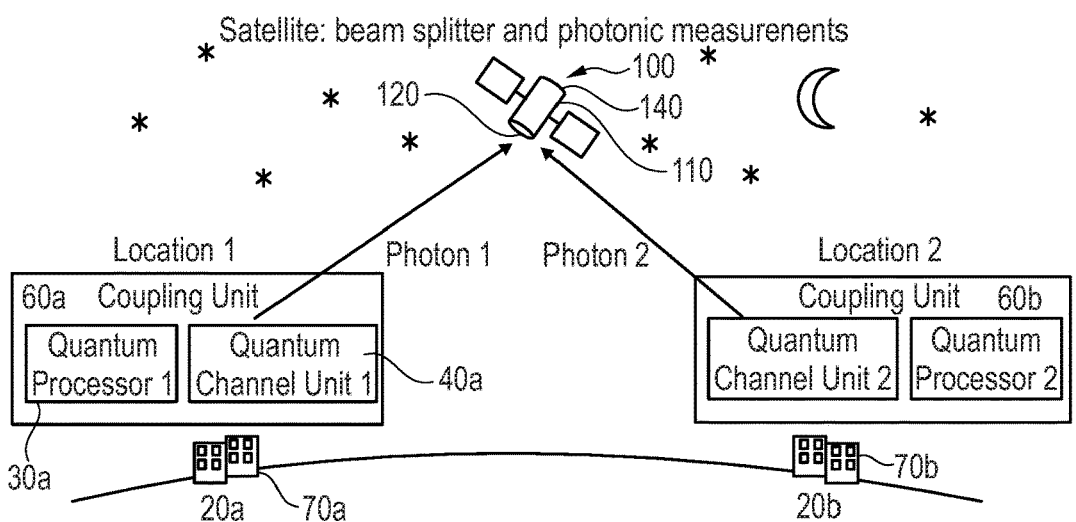
FIG. 2 shows a schematic view of another possible realization of the minimal system, with the satellite receiving a pair of photons emitted from the two ground units at distant locations.
Figure 3:
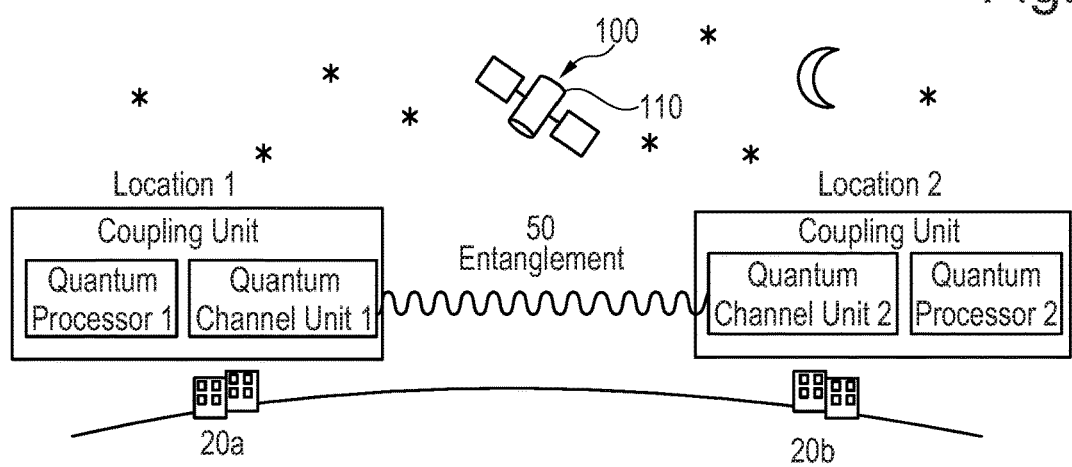
FIG. 3 shows a schematic view of the minimal system, with the distant locations connected by a quantum channel.

A minimal example of such a distributed quantum computing system 10 is based on two quantum processors 30a and 30b located at ground nodes 20a and 20b interconnected by a quantum channel 50 and is shown in FIGS. 1-3. Such a minimal system for the distributed quantum computing system has at least two main building blocks: a satellite unit 110 located in a satellite 100 (orbiting in space), and at least the two ground nodes 20a and 20b, as is shown in FIGS. 1, 2 and 3.

Figure 6:
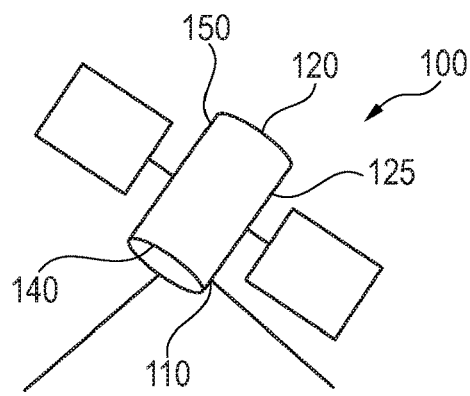
FIG. 6 shows an example of a satellite.

The satellite 100 is shown in more detail in FIG. 6 and is, in one non-limiting example, in a geostationary orbit system such as those used for Quantum Key Distribution (QKD) applications. The satellite 100 has a satellite unit 110 which can downlink data to the ground nodes 20a and 30b.

In a non-limiting implementation set out in FIG. 1, the satellite unit 110 includes at least a photon source 120 of EPR-entangled photons, 125 as well as a module for classical communication 150 with the ground nodes 20a and 20b.

In another implementation set out in FIG. 2, the satellite unit 110 of the satellite includes a photonic interference and measurement system 140, as well as a satellite communications module 150 for classical communication with the ground nodes 20a and 20b.

As an example, without excluding other options, one could use the satellites 100 in the geostationary orbit, at 36,000 km above Earth's ground and with approximately ⅓ of Earth coverage.

The ground nodes 20a and 20b may be, at least initially, laboratories on Earth's surface. The ground nodes 20a and 20b include at least a quantum processor (QP) 30a and 30b responsible for local quantum information processing, a quantum channel unit (QCU) 40a, 40b responsible for establishing the quantum channel 50 with distant locations in coordination with the satellite 100, a coupling unit (CU) 60a, 60b responsible of transferring quantum information between the quantum processor and the quantum channel unit.

The ground nodes 20a, 20b may also comprise a classical communications module 70a, 70b, responsible for standard communications with other ones of the ground nodes 20a and 20b. The classical communications modules 70 in the ground nodes 20a and 20b are connected together by, for example, the Internet.

The quantum processors 30a and 30b could in principle be of any kind, as long as the quantum processors 30a and 30 allow some type of interconnectivity with other quantum processors 30a and 30b of the same or different kind. An example, without excluding other options, is an ion trap quantum processor, where charged ions (e.g., of calcium or ytterbium) are trapped by electromagnetic fields and addressed individually by laser light that trigger transitions in the energy levels, with the ability to implement single-qubit gates by single-site laser addressing as well as two-qubit gates using the collective vibration modes (phonons) of the ion crystal.

The quantum channel units (QCU) 40a and 40b are of any kind that allows (i) reception and storage of the quantum state of a photon 130a and 130b, and (ii) exchange of quantum information with a quantum processor. An example, without excluding other options, is a cavity-QED system, where atoms are trapped in a reflective cavity and interact with the light confined in the reflective cavity. The atoms in the cavity-QED devices have proven their validity as valid QCUs by coupling trapped ions at intermediate distances via photons distributed by optical fibre, see for example, Northup, T, "Aton-photon coupling with trapped ions," Institute for Experimental Physics, University of Innsbruck. Another example, without excluding other options, could be one of the ions in an ion crystal, being this individual ion specially used for this purpose.

The coupling unit 60a, 60b is any system and method that allows the exchange of quantum information between the quantum processor 30a, 30b and the quantum channel unit 40a, 40b. This is, for instance, an immersion of some ions on the cavity system with the ability to absorb photons from the satellite. Another example is a SWAP operation between a specific ion and a single special ion in the system with the sole purpose to establish the quantum channel 50.

The classical communication module 70 is of any kind that allows fast and reliable (standard) communication between distant locations. These include ground node 20a, 20b to satellite 100 as well as ground-ground communications.

It will be appreciated that the distributed quantum computing system 10 and the method set out in this document can be generalized to as many ground nodes 20a, 20b and as many satellite units 110, as necessary to carry on a given quantum circuit using several quantum processors at distant locations on Earth acting together coherently as a whole. In a general computation, the ground nodes 20a and 20b on Earth's surface carry individual parts of the quantum computation that can be parallelized.

Figure 4:
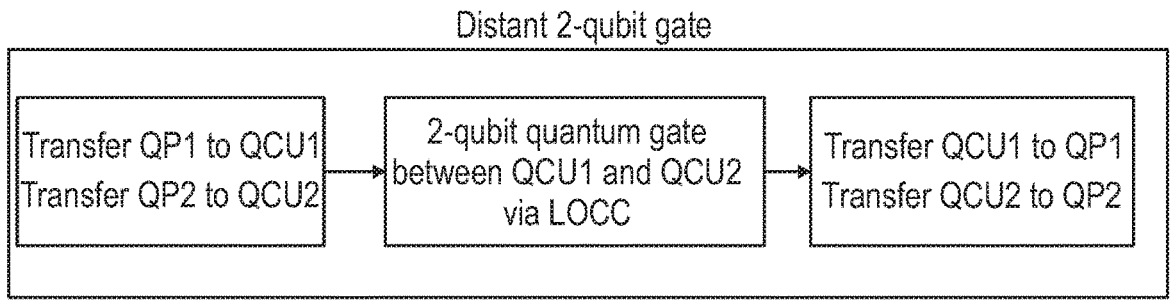
FIG. 4 shows a protocol for establishing a distant 2-qubit gate.

FIG. 4 shows an example of a protocol for establishing a distant 2-qubit gate. Let us suppose that a 2-qubit gate needs to be done between two of the ground nodes 20a and 20b using a gate implementor module. The steps of the protocol shown in FIG. 4 are outlined in FIG. 5

In a first step 510 the quantum channel 50 is established between the two ground nodes 20a and 20b. This first step 510 is done between the two remote ground nodes 20a, 20b using the satellite unit 110, and can be done in several ways. In a first aspect of the invention shown in FIG. 1, the satellite unit 110 has the aforementioned photon source 120 of EPR-entangled photons which are emitted from the satellite 100 to the two ground nodes 20a, 20b. One photon 130a, 130b is transferred to each ground node 20a, 20b. The photons 130a, 130b in the ground nodes 20a, 20b are stored in the QCUs 40a, 40b in such a way that the ground nodes 20a, 20b become entangled as in FIG. 3.

An alternative implementation for the specific case of ion trap processors is shown in FIG. 2, and this FIG. 2 illustrates using the satellite 100 that, instead of emitting the photons 130a, 130b, receives the photons from emitting ions in the ground QPs 30a, 30b and performs a 50/50 beam splitting operation together with a Bell state detection. This creates an EPR-state between the ions in the distant traps as in FIG. 3.

The above operations can be repeated to establish a single EPR pair of photons or a plurality of the EPR pairs, as required by the protocol to be used in the following step.

A 2-qubit gate between the distant ground nodes follows the scheme from FIG. 4. More specifically, when a distant 2-qubit gate needs to be implemented, the following steps are performed. In a first step, the involved qubits in the QPs 30a, 30b are swapped with those qubits in the QCUs 40a, 40b. The 2-qubit gate is then implemented via local Operations and classical Communication (LOCC), and finally, the quantum information from QCUs 40a, 40b to the QPs 30a1 30b. This can be implemented by a plurality of protocols devised to implement remote two-qubit gates, such as Controlled-NOT, Controlled-Phase, and SWAP gates (for a typical cases).

Figure 5:
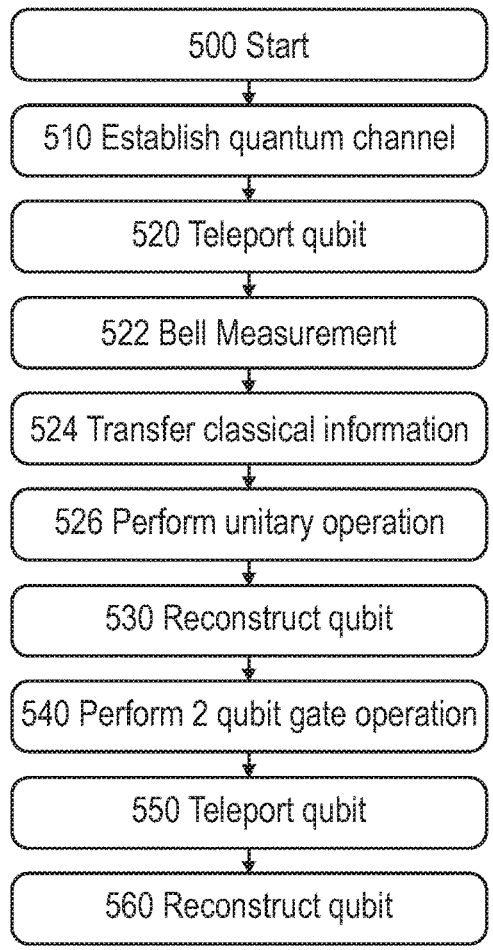
FIG. 5 shows a method for establishing a distant 2-qubit gate.

An example of protocol, without excluding other possible options, involves a quantum channel 50 with two EPR pairs and uses quantum teleportation between the two ground nodes 20a, 20b to implement the 2-qubit gate between distant qubits as shown in FIG. 5.

The first ground node 20a teleports in step 520 its qubit by means of one of the EPR pairs that shares with the second ground node 20b. This is done as follows in a first step 522 a Bell measurement can be carried at the first ground node 20a out on the qubit in the EPR pair and the qubit to be teleported. This gives two bits of classical information which correspond to the outcome of the measurement. The two qubits at the first ground node 20a are then discarded. In practice, for the specific case of ion traps, the Bell measurement is performed on two ions simultaneously via known protocols In a next step 524 the two bits of classical information are transmitted from the first ground node 20a to the second ground node 20b. This transmission is done via usual classical communication, e.g., a telephone or internet connection. The second ground node 20b has now the teleported qubit from the first ground node 20a.

In step 530, at the second ground node 20b, a specific unitary quantum gate operation is performed on the qubit of the EPR pair. This operation depends on the two classical bits being received from the first ground node 20b in step 524. After this operation, the qubit is reconstructed and is in a quantum state identical to the original one in the first ground node 20a. Now the teleportation is completed, and the second ground node 20b has the whole 2-qubit system.

The unitary operation in step 550 on the qubit of the second ground node 20b is performed via laser pulses acting individually on the corresponding ion, in the same way as would be done on a single-qubit gate.

As local operations are allowed, the second ground node 20b performs the 2-qubit gate operation on its 2-qubit system in step 540. The second ground node 20b uses in step 550 the second EPR pair and classical communication in order to teleport the first qubit back to the first ground node 20a.

Finally, the first ground node 20a reconstructs in step 560 the qubit by applying the operations in its half of the EPR pair used for the teleportation in the step 520, depending on the information classically obtained from the second ground node 20b in step 550, so that teleportation is complete again.

The system and method as set out in this document are extendable to as many nodes as necessary, including different hardware architectures and protocols, as well as very distant locations via intermediate ground nodes acting as quantum repeaters.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the aforementioned documents is incorporated by reference herein.

REFERENCE NUMERALS

10 A distributed quantum computing system
20a, 20b Ground nodes
30a, 30b Quantum processor
40a, 40b Quantum channel unit
50 Quantum channel
60 Coupling unit
70 Classical communications module
100 Satellite
120 Photon source
125 Pair of entangled photons
130a, 130b Photons
140 Photon interference and measuring system
150 Satellite communications module

What is claimed is:
1. A distributed quantum computing system comprising:
at least two ground nodes located apart at a distance, wherein ones of the at least two ground nodes comprise a quantum processor, a quantum channel unit for establishing quantum channels with other ones of the at least two ground nodes, a coupling unit for transferring quantum information between the quantum processor and the quantum channel unit, and
a satellite unit for creating entanglement between a first channel unit in a first ground node and a second channel unit in a second ground node to enable establishment of said quantum channels,
wherein the satellite unit comprises a photon source of entangled photons, the photon source being adapted to transfer pairs of entangled photons to the first ground node and the second ground node;
wherein the distributed quantum computing system is configured to:
carry out, at the first ground node, a Bell measurement on a first entangled photon of a first pair of entangled photons and a first qubit;
transmit, from the first ground node to the second ground node via classical communication, two bits of classical information resulting from the Bell measurement of the first entangled photon of the first pair of entangled photons and the first qubit;
reconstruct, by the second ground node, the first qubit, based on a second entangled photon of the first pair of entangled photons and the two classical bits received from the first ground node;
perform, by the second ground node, a 2-qubit gate operation on a 2-qubit system comprising the first qubit;
carry out, at the second ground node, a Bell measurement on a first entangled photon of a second pair of entangled photons and the first qubit;
transmit, from the second ground node to the first ground node via classical communication, two bits of classical information resulting from the Bell measurement of the first entangled photon of the second pair of entangled photons and the first qubit;
reconstruct, by the first ground node, the first qubit, based on a second entangled photon of the second pair of entangled photons, and the two bits of classical information received from the second ground node.

2. The distributed quantum computing system according to claim 1, wherein the satellite comprises the photon source of said pairs of entangled photons adapted to emit said pairs of entangled photons, wherein the first ground node has a first quantum channel unit for receiving a first photon of a respective pair of said pairs of entangled photons and storing a quantum state of the first photon, and the second ground node has a second quantum channel unit for receiving a second photon of said respective pair of said pairs of entangled photons and storing a quantum state of the second photon.

3. The distributed quantum computing system according to claim 1, wherein the first quantum channel unit and the second quantum channel unit are at least one of a cavity QED system or an ion crystal.

4. The distributed quantum computing system according to claim 1,
wherein the first quantum channel unit has a first ion trap processor for emitting a first photon, and the second quantum channel unit has a second ion trap processor for emitting a second photon,
and wherein the satellite unit is adapted to receive the first photon and the second photon emitted from the first ground node and the second ground node, the satellite unit comprising a photonic interference and measurement system for setting up pairs of entangled photons and the quantum channel between the first ground node and the second ground node.

5. The distributed quantum computing system according to claim 1, wherein the ground node has a classical communications module for standard communications with other classical communications modules of other ones of the ground nodes and with a satellite communication module.

6. A method of implementing a distributed quantum computing system, the distributing quantum system comprising at least two ground nodes located apart at a distance, the method comprising:
  establishing at least one quantum channel between the at least two ground nodes wherein the step of establishing of the at least one quantum channel between the at least two ground nodes comprises creating entanglement, by a satellite, between a first channel unit in the first ground node and a second channel unit in the second ground node,
  wherein the satellite unit comprises a photon source of entangled photons, the photon source being configured to transmit pairs of entangled photons to the first ground node and the second ground node,
  wherein the distributed quantum computing system is configured to:
  carry out, at the first ground node, a Bell measurement on a first entangled photon of a first pair of entangled photons and a first qubit;
  transmit, from the first ground node to the second ground node via classical communication, two bits of classical information resulting from the Bell measurement of the first entangled photon of the first pair of entangled photons and the first qubit;
  reconstruct, by the second ground node, the first qubit, based on a second entangled photon of the first pair of entangled photons and the two classical bits received from the first ground node;
  perform, by the second ground node, a 2-qubit gate operation on a 2-qubit system comprising the first qubit;
  carry out, at the second ground node, a Bell measurement on a first entangled photon of a second pair of entangled photons and the first qubit;
  transmit, from the second ground node to the first ground node via classical communication, two bits of classical information resulting from the Bell measurement of the first entangled photon of the second pair of entangled photons and the first qubit:
  reconstruct, by the first ground node, the first qubit, based on a second entangled photon of the second pair of entangled photons, and the two bits of classical information received from the second ground node.

7. The method according to claim 6, wherein the establishing of the at least one quantum channel between the at least two distant ground nodes comprises:
  emitting, by a source of entangled photons in a satellite unit, a pair of first entangled photons and second entangled photons;
  receiving, by and/or at the first ground node, the first entangled photon and storing the quantum state of the first entangled photon;
  receiving, by and/or at the second ground node, the second entangled photon and storing the quantum state of the second entangled photon, to establish the at least one quantum channel.

8. The method according to claim 6, wherein the establishing of the at least one quantum channel between the at least two distant ground nodes comprises:
  receiving photons by emitting a first photon by the first quantum channel unit and a second photon by the second quantum channel unit,
  and wherein the satellite receives the first photon emitted from the first ground node and the second photon emitted from the second ground nodes, and processes the first photon and the second photon with a photonic interference and measurement system to create a pair of entangled photons and a quantum channel between the first ground node and the second ground node.

9. A satellite for creating entanglement between quantum channel units in at least two ground nodes and thereby enabling establishment of a quantum channel between the at least two ground nodes,
  wherein the satellite comprises a photon source of entangled photons, the photon source being configured to transmit pairs of entangled photons to a first ground node and a second ground node, in such a way that:
  a Bell measurement on a first entangled photon of a first pair of entangled photons and a first qubit is carried out at the first ground node;
  two bits of classical information resulting from the Bell measurement of the first entangled photon of the first pair of entangled photons and the first qubit are transmitted from the first ground node to the second ground node via classical communication;
  the first qubit is reconstructed by the second ground node, based on a second entangled photon of the first pair of entangled photons and the two classical bits received from the first ground node;
  a 2-qubit gate operation on a 2-qubit system comprising the first qubit is performed by the second ground node:
  a Bell measurement is carried out on a first entangled photon of a second pair of entangled photons and the first qubit at the second ground node;
  two bits of classical information resulting from the Bell measurement of the first entangled photon of the second pair of entangled photons and the first qubit are transmitted from the second ground node to the first ground node via classical communication;
  the first qubit is reconstructed by the first ground node, based on a second entangled photon of the second pair of entangled photons, and the two bits of classical information received from the second ground node.

10. A ground node in a distribution quantum computing system comprising:
  a quantum processor;
  a quantum channel unit for establishing quantum channels with other ones of the ground nodes and a satellite unit; and
  a coupling unit for transferring quantum information between the quantum processor and the quantum channel unit,
  wherein the satellite unit comprises a photon source of entangled photons, the photon source being configured to transmit pairs of entangled photons to the ground node and another ground node,
  wherein the ground node is configured to:
  carry out a Bell measurement on a first entangled photon of a first pair of entangled photons and a first qubit;
  transmit, from the ground node to said another ground node via classical communication, two bits of classical information resulting from the Bell measurement of the first entangled photon of the first pair of entangled photons and the first qubit;

receive, by the ground node and from said another ground node via classical communication, two bits of classical information resulting from a Bell measurement of the first entangled photon of a second pair of entangled photons and the first qubit, wherein said two bits of classical information resulting from a Bell measurement of the first entangled photon of a second pair of entangled photons and the first qubit are determined by:

reconstruct, by said another ground node, the first qubit, based on a second entangled photon of the first pair of entangled photons and the two classical bits received from the ground node;

performing, by said another ground node, a 2-qubit gate operation on a 2-qubit system comprising the first qubit;

carrying out, at said another ground node, a Bell measurement on a first entangled photon of a second pair of entangled photons and the first qubit;

reconstruct, by the ground node, the first qubit, based on a second entangled photon of the second pair of entangled photons, and the two bits of classical information received from said another ground node.

* * * * *